United States Patent [19]

Garrison

[11] Patent Number: 5,078,899

[45] Date of Patent: Jan. 7, 1992

[54] TREATING MINE WATER

[75] Inventor: Larry Garrison, Rochester, N.Y.

[73] Assignee: Idaho Research Foundation, Inc., Moscow, Id.

[21] Appl. No.: 531,889

[22] Filed: May 1, 1990

[51] Int. Cl.$^5$ .............................................. C02F 1/24
[52] U.S. Cl. ................................... 210/704; 210/710; 210/768; 210/800; 210/804
[58] Field of Search ............... 210/704, 705, 710, 800, 210/804, 768

[56] References Cited

U.S. PATENT DOCUMENTS

| | | | |
|---|---|---|---|
| 3,607,217 | 9/1971 | Metraller | 75/4 |
| 3,977,892 | 8/1976 | Crossmore, Jr. | 106/288 B |
| 4,234,320 | 11/1980 | Verschuur | 44/23 |
| 4,248,697 | 2/1981 | Halvorsen | 209/5 |
| 4,719,008 | 1/1988 | Sparks et al. | 208/390 |
| 4,726,810 | 2/1988 | Ignasiak | 44/51 |
| 4,730,787 | 3/1988 | Trass | 241/15 |
| 4,751,259 | 6/1988 | Roe et al. | 524/52 |
| 4,770,766 | 9/1988 | Keller. Jr. et al. | 209/5 |
| 4,776,859 | 10/1988 | Passarini et al. | 44/51 |
| 4,849,021 | 7/1989 | Nakai et al. | 106/472 |

FOREIGN PATENT DOCUMENTS

| | | | |
|---|---|---|---|
| 5383350 | 12/1976 | Japan | 210/704 |
| 833568 | 5/1981 | U.S.S.R. | 210/704 |

*Primary Examiner*—Stanley Silverman
*Assistant Examiner*—Krisanne Shideler
*Attorney, Agent, or Firm*—Wells, St. John & Roberts

[57] ABSTRACT

In accordance with the invention, a method of treating mine water to remove ferric hydroxide comprises:

combining acidic mine water with a predetermined amount of a fatty oil to produce a mixture;

agitating the mixture for a first predetermined period of time to agglomerate solid ferric hydroxide and oil;

allowing the agitated mixture to settle within a vessel for a second predetermined period of time to cause agglomerated ferric hydroxide and oil to rise to an upper level of the agitated mixture to provide a settled mixture of agglomerated hydroxide and oil floating atop remaining liquid therebelow; and separating the agglomerated ferric hydroxide and oil at the upper level of the settled mixture from the remaining liquid.

The process can also be conducted under such conditions that most all of the zinc follows the ferric hydroxide into the agglomerate phase.

32 Claims, No Drawings

TREATING MINE WATER

TECHNICAL FIELD

This invention relates generally to treatment of acid mine water, and more particularly to recovery of yellow boy (ferric hydroxide) and zinc from acid mine water.

BACKGROUND OF THE INVENTION

The invention rose primarily out of the needs and concerns associated with mining the ore deposits of the Coeur d'Alene area in the North Idaho panhandle. The predominant economic base metal ores of this area are galena (PbS) and sphalerite (ZnS). One uneconomic ore also found in great abundance and in intimate association with these base metal ores is pyrite ($FeS_2$). This mineral plagues the efforts of recovery and processing of rare earth metals, such as gold and silver, as well as the base metals of zinc and lead.

The presence of pyrite not only hampers recovery and processing procedures for metals, but it also presents the mining industry with a challenge to meet and maintain discharge water quality standards. A highly acidic mine water results from bringing together the necessary elements of oxygen, water and sulfide bearing minerals such as pyrite, sphalerite and galena. The mine environment is quite conducive to the generation of acid mine water through the oxidation of sulfur and iron to sulfuric acid and ferric residues, which is in part due to a bacteria catalyzed reaction of iron with water.

Hand-in-hand with the efforts to maintain water quality standards is the economic desire to recover the values in these ores. A potential economic source of zinc can be found as soluble zinc and iron flowing in the acid mine drainage of both active and inactive mine environments. The source of this soluble zinc and iron is from water resulting from the condition created from a naturally occurring in situ bacterial leach from overburdened deposits of the pyrite and sphalerite. Water percolating through the broken refractory ore strata initiates a biochemical oxidative reaction between a predominantly endemic bacteria, *thiobacillus ferrooxidan*, and the ore.

Pyrite oxidation is a model system for discussing the chemical and biochemical reactions responsible for the creation of acidic waste water flows. The following expressions are generally considered as accurate representations of the overall chemical/biochemical behavior of ore body leaching.

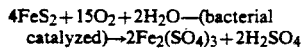

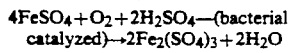

These reactions can and do occur as purely chemical oxidations. However, the bacteria are autolithotropic and utilize the iron as an electron source to drive their own metabolic machinery and in so doing act as catalysts by lowering the activation energy of the reaction. This lower activation energy in turn accelerates the reactions to generate product.

The subsequent reaction in the interior of the mineral is anaerobic in nature and occurs as follows:

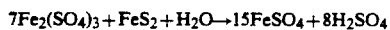

As can be observed from the above, a by-product of sulphate ($SO_4$) is liberated and contributes to the increased acidity of the percolating water.

With acid pH conditions under 2.5, both zinc and iron are relatively soluble and therefore are in solution. At a pH of approximately 2.67 or above, $Fe^{3+}$ at $10^{-4}$ molar concentration (a typical concentration) becomes insoluble and precipitate as ferric hydroxide ($Fe(OH)_3$), which is commonly known as yellow boy. The higher the iron concentration, the lower the pH at which ferric hydroxide will precipitate. Throughout this document, reference will be made to "ferric hydroxide" while it is to be understood that the true nature of this precipitated material could be in the form of $Fe_2O_3 \cdot nH_2O$.

Ferric hydroxide is a stubborn gelatinous material that is difficult to remove from acid mine drain water. Presently, the most cost effective prior art methods for removal of precipitated ferric hydroxide is by flocculation with polyionic polyacrylamides. Slurried calcium oxide (CaO) is mixed with the mine discharge water and tailings from the metals processing mills to increase the pH to a range of 6.0 to 8.5. In this pH range, most processed by-product metals precipitate as hydroxides or carbonates. The flocculating agent provides a mechanism for entrapping the precipitated material through polyionic bonds and consequently increases its density beyond that of water. These compounds are pumped to settling ponds or sedimentation circuits to remove heavy metals and unwanted minerals. The water is then returned to the milling circuit or released to the environment. This prior art process takes weeks for proper settling and sedimentation, and requires significant capital a large area of land. Further, inherent in this prior art practice is the discarding of possibly significant amounts of potentially recoverable zinc.

Accordingly, a need remains for an improved process for removing yellow boy from acid mine water drainage.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

In accordance with the invention, a method of treating mine water to remove ferric hydroxide comprises:
  combining acidic mine water with a predetermined amount of a fatty oil to produce a mixture;
  agitating the mixture for a first predetermined period of time to agglomerate solid ferric hydroxide and oil;
  allowing the agitated mixture to settle within a vessel for a second predetermined period of time to cause agglomerated ferric hydroxide and oil to rise to an upper level of the agitated mixture to provide a settled mixture of agglomerated hydroxide and oil floating atop remaining liquid therebelow; and
  separating the agglomerated ferric hydroxide and oil at the upper level of the settled mixture from the remaining liquid.

In the context of this document, the term "fatty oil" is synonymous with "fixed oil", which defines any nonvolatile oil, or a fat that is liquid at ordinary temperatures and that is obtained from plants (i.e. vegetables) or marine animals. Preferred fatty oils are ones that are derived from one or more straight chain alkanoic acids of the general formula $CH_3(CH_2)_nCOOH$. An alternative category of fatty oils would be derived from one or more fatty acids selected from the group consisting of oleic acid and linoleic acid. Most preferred would be edible fatty oils due to their inherent lack of toxicity. Examples of fatty oils include palmitic, stearic, oleic, linoleic and tall oils.

An initial step in removing iron from solution as ferric hydroxide will be to increase the pH of the discharge stream, where necessary to cause iron to precipitate as ferric hydroxide. Solubility of $Fe^{3+}$ is represented as:

$$[Fe^{3+}][OH^-]=10^{-38}$$

As such, the higher the iron concentration, the lower the pH at which ferric hydroxide will precipitate.

With ferric hydroxide solids in the mine water, the preferred predetermined amount of fatty oil is from approximately a ratio of 13:1 to 140:1 grams of oil to grams of ferric hydroxide.

Preferably, a flotation reagent is agitated in with the mixture. The flotation reagent is preferably present in an amount from approximately a ratio of $5 \times 10^{-5}:1$ to $50 \times 10^{-5}:1$ grams of flotation reagent to grams of ferric hydroxide solids.

The first predetermined period of time, or the time for agitation, is from approximately 5 to 125 seconds, and at approximately 6,000 to 12,000 rpm in a blender style mixer to cause the yellow boy constituent (Fe(OH)$_3$) to become agglomerated in the disbursed oil droplets. Agitation time and degree should not be so great such as to cause an emulsion to form.

The second predetermined period of time, or the time for settling, will typically be less than 5 seconds, and in some cases less than 3 seconds to cause the agglomerated material to rise to the upper level of the liquid. The floating oil and agglomerate product is then suction decanted, or otherwise separated, from the liquid therebelow leaving a slightly emulsified oil and water mixture. The remaining emulsion is presumably the result of excess oil or oil droplets too small to capture a significant amount of solids.

At this point, the emulsion portion without the solids can be poured through a coarse fiber filter. In the examples that were tested for proof-of-principle of the invention, the resultant liquid was an apparently clean, ferric hydroxide free, oil free, pH neutral water capable of immediate release into the environment without further treatment. At this writing, the reason for the desired pH alteration to substantial neutrality is not fully understood. The pH change may be the result of minor saponification of the oil.

The oil and yellow boy agglomerate remaining or removed from the liquid is at a consistency suitable for prilling. Preferably, Portland cement is added as a binder to roll the agglomerate into small diameter prills on a rotating tilting pan agglomerator. The agglomerate is allowed to dry naturally or by forced heating whereby it becomes dry, hard, and easily handled material for disposal or further processing.

Table 1 below represents parameter values obtained from direct experimentation and recovery using safflower oil and American Cyanamid's Aeromine 3037 TM as a promoter/flotation reagent. Other oils or flotation reagents might of course be used without departing from the principles and scope of the invention.

TABLE 1

| TEST | SEP | SOLIDS | ZINC | OIL | PROMOTER | RPM | TIME |
|------|------|--------|-------|--------|----------|-------|------|
| 1    | 2.75 | 80.04  | 52.05 | 13.85  | 5.0      | 6.25  | 5    |
| 2    | 1.78 | 86.38  | 55.56 | 138.00 | 50.0     | 6.25  | 5    |
| 3    | 1.62 | 98.37  | 69.59 | 138.60 | 5.0      | 10.55 | 5    |
| 4    | 2.47 | 97.65  | 63.74 | 13.60  | 50.0     | 10.55 | 5    |
| 5    | 1.78 | 94.60  | 60.23 | 138.60 | 5.0      | 6.25  | 125  |
| 6    | 2.25 | 95.98  | 69.59 | 13.60  | 50.0     | 6.25  | 125  |
| 7    | 2.00 | 92.65  | 63.74 | 13.60  | 5.0      | 19.55 | 125  |
| 8    | 2.62 | 97.73  | 64.91 | 138.60 | 50.0     | 10.55 | 125  |
| 9    | 2.35 | 98.90  | 61.40 | 138.60 | 5.0      | 6.25  | 5    |
| 10   | 3.72 | 87.75  | 59.06 | 13.58  | 50.0     | 6.25  | 5    |
| 11   | 2.56 | 93.06  | 60.23 | 13.58  | 5.0      | 10.55 | 5    |
| 12   | 2.66 | 98.93  | 64.91 | 138.60 | 50.0     | 10.55 | 5    |
| 13   | 1.75 | 89.38  | 60.23 | 13.58  | 5.0      | 6.25  | 125  |
| 14   | 2.46 | 93.20  | 62.57 | 138.60 | 50.0     | 6.25  | 125  |
| 15   | 2.50 | 89.17  | 59.06 | 138.60 | 5.0      | 10.55 | 125  |
| 16   | 2.42 | 90.40  | 60.23 | 13.58  | 50.0     | 10.55 | 125  |
| 17   | 1.87 | 91.86  | 60.23 | 76.80  | 1.4      | 8.40  | 60   |

SCALING AND LEGEND
SEP: Time (in seconds) for a typical soldis/oil agglomerate to float to the top of the blender after agitation ceases.
SOLIDS: Recovery (%) of solids (measured by acidifying remaining solution and assaying for iron by atomic absorption).
ZINC: Recovery (%) of zinc ion to the solids phase (measured by assaying remaining solution by atomic absorption).
OIL: Grams Safflower oil/grams ferric hydroxide solids in the acid mine drainage.
PROMOTER: Grams of American Cyanamid's Aeromine 3037 TM /gram ferric hydroxide solids in the acid mine drainage (scaled by $10^{-5}$).
RPM: Measure of agitation in blender (scaled by $10^{-3}$).
TIME: Time (in seconds) of agitation in blender.

A statistical analysis approach was utilized to correlate the possible relationships among the variables. The intent of the evaluation was to locate extreme points of interaction among the variables and then statistically evaluate the probability of linear correlations. From such analysis, it was determined that solids and zinc recovery were significantly correlated. The recovery of zinc may be related to the recovery of ferric hydroxide solids in several ways. The chelating action of the flotation reagent may be responsible for attaching a hydrocarbon ring to the zinc ion which is subsequently trapped in the oil. Or, a second possibility is that the tenacious absorbing characteristics of ferric hydroxide are responsible for pulling zinc from the solution. A third possibility is that zinc hydroxide solids are formed from the oil neutralization of the acidic water and are recovered with the ferric hydroxide. At this writing, it is believed that zinc recovery in the solids phase is maximized by a high ratio of oil to solids. Excess oil apparently raises the pH to precipitate the zinc as an oxide along with the iron hydroxide.

Zinc could then be recovered from the agglomerate after prilling by a calcination or other process. For example, a zinc calcination is possible whereby the agglomerated and prilled solids are roasted at temperatures high enough to vaporize the zinc material. The zinc vapor could then be distilled through condensation coils to recover high purity zinc metal. The zinc that stays in solution can also be recovered by electroplating (electrowinning).

It might also be possible and desirable to select a flotation reagent/promoter that has the effect of keeping the zinc in solution for later recovery, as opposed to becoming agglomerated with the ferric hydroxide. A specific promoter that serves to keep the zinc in solution would need to be selected. The ideal property of such a promoter would be to selectively attach a hydrophobic radical to the iron hydroxide but not to the zinc or zinc oxide (or possibly zinc hydroxide). The zinc could be recovered using known processes.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A method of treating mine water to remove ferric hydroxide comprising:
    combining acidic mine water with a predetermined amount of a fatty oil to produce a mixture;
    agitating the mixture for a first predetermined period of time to agglomerate solid ferric hydroxide and oil;
    allowing the agitated mixture to settle within a vessel for a second predetermined period of time to cause agglomerated ferric hydroxide and oil to rise to an upper level of the agitated mixture to provide a settled mixture of agglomerated ferric hydroxide and oil floating atop remaining liquid therebelow; and
    separating the agglomerated ferric hydroxide and oil at the upper level of the settled mixture from the remaining liquid.

2. The method of treating mine water to remove ferric hydroxide of claim 1 wherein the predetermined amount of fatty oil is from approximately a ratio of 13:1 to 140:1 grams of oil to grams of ferric hydroxide solids in the mine water.

3. The method of treating mine water to remove ferric hydroxide of claim 1 further comprising combining the mine water and fatty oil with a predetermined amount of a flotation reagent and agitating the mixture of mine water, fatty oil and flotation reagent.

4. The method of treating mine water to remove ferric hydroxide of claim 3 wherein the predetermined quantity of flotation reagent is from approximately a ratio of $5 \times 10^{-5}:1$ to $50 \times 10^{-5}:1$ grams of flotation reagent to grams of ferric hydroxide solids in the mine water.

5. The method of treating mine water to remove ferric hydroxide of claim 3 wherein the second predetermined period of time is less than approximately five seconds.

6. The method of treating mine water to remove ferric hydroxide of claim 3 wherein the second predetermined period of time is less than approximately three seconds.

7. The method of treating mine water to remove ferric hydroxide of claim 1 wherein,
    the predetermined amount of fatty oil is from approximately a ratio of 13:1 to 140:1 grams of oil to grams of ferric hydroxide solids in the mine water; and
    further comprising combining the mine water and fatty oil with a predetermined amount of a flotation reagent and agitating the mixture of mine water, fatty oil and flotation reagent, the predetermined quantity of flotation reagent being from approximately a ratio of $5 \times 10^{-5}:1$ to $50 \times 10^{-5}:1$ grams of flotation reagent to grams of ferric hydroxide solids in the mine water.

8. The method of treating mine water to remove ferric hydroxide of claim 1 wherein the first predetermined period of time is from approximately 5 to 125 seconds.

9. The method of treating mine water to remove ferric hydroxide of claim 8 comprising stirring the mixture at from approximately 6000 to 12000 rpm.

10. The method of treating mine water to remove ferric hydroxide of claim 1,
    wherein the predetermined amount of fatty oil is from approximately a ratio of 13:1 to 140:1 grams of oil to grams of ferric hydroxide solids in the mine water;
    further comprising combining the mine water and fatty oil with a predetermined amount of a flotation reagent and agitating the mixture of mine water, fatty oil and flotation reagent, the predetermined quantity of flotation reagent being from approximately a ratio of $5 \times 10^{-5}:1$ to $50 \times 10^{-5}:1$ grams of flotation reagent to grams of ferric hydroxide solids in the mine water; and
    wherein the step of agitating the mixture comprises stirring the mixture for from approximately 5 to 125 seconds at approximately from 6000 to 12000 rpm.

11. The method of treating mine water to remove ferric hydroxide of claim 10 wherein the second predetermined period of time is less than approximately five seconds.

12. The method of treating mine water to remove ferric hydroxide of claim 10 wherein the second predetermined period of time is less than approximatly three seconds.

13. The method of treating mine water to remove ferric hydroxide of claim 1 wherein the fatty oil is derived from one or more straight chain alkanoic acids of the general formula $CH_3(CH_2)_nCOOH$.

14. The method of treating mine water to remove ferric hydroxide of claim 1 wherein the fatty oil is derived from one or more fatty acids selected from the group consisting of oleic acid and linoleic acid.

15. The method of treating mine water to remove ferric hydroxide of claim 1 wherein the steps of combining, mixing and settling is conducted to produce a substantially neutral pH in the remaining liquid, and further comprising:

passing the remaining liquid through a mechanical filter to produce substantially clean water capable of immediate release into the environment without further treatment.

16. The method of treating mine water to remove ferric hydroxide of claim 1 further comprising prilling the agglomerated ferric hydroxide and oil with a cement binder.

17. The method of treating mine water to remove ferric hydroxide of claim 1 wherein the steps of combining, mixing and settling is conducted to produce a substantially neutral pH in the remaining liquid, and further comprising:

passing the remaining liquid through a mechanical filter to produce substantially clean water capable of immediate release into the environment without further treatment; and prilling the agglomerated ferric hydroxide and oil with a cement binder.

18. A method of treating mine water to remove ferric hydroxide comprising:

combining acidic mine water with a fatty oil and a flotation reagent to produce a mixture, the fatty oil being present in an amount from approximately a ratio of 13:1 to 140:1 grams of oil to grams of ferric hydroxide solids in the mine water, the flotation reagent being present in an amount from approximately a ratio of $5 \times 10^{-5}:1$ to $50 \times 10^{-5}:1$ grams of flotation reagent to grams of ferric hydroxide solids in the mine water;

agitating the mixture by stirring at between approximately 6000 and 12000 rpm for from approximately 5 to 125 seconds to agglomerate solid ferric hydroxide and oil;

allowing the agitated mixture to settle within a vessel to cause agglomerated ferric hydroxide and oil to rise to an upper level of the agitated mixture in less than five seconds to provide a settled mixture of agglomerated ferric hydroxide and oil floating atop remaining liquid therebelow;

separating the agglomerated ferric hydroxide and oil at the upper level of the settled mixture from the remaining liquid; and prilling the agglomerated ferric hydroxide and oil with a cement binder.

19. A method of treating mine water to remove ferric hydroxide and zinc comprising:

combining acidic mine water with a predetermined amount of a fatty oil to produce a mixture;

agitating the mixture for a first predetermined period of time to agglomerate solid ferric hydroxide, zinc and oil;

allowing the agitated mixture to settle within a vessel for a second predetermined period of time to cause agglomerated ferric hydroxide, zinc and oil to rise to an upper level of the agitated mixture to provide a settled mixture of agglomerated ferric hydroxide, zinc and oil floating atop remaining liquid therebelow; and separating the agglomerated ferric hydroxide, zinc and oil at the upper level of the settled mixture from the remaining liquid.

20. The method of treating mine water to remove ferric hydroxide of claim 19 wherein the predetermined amount of fatty oil is from approximately a ratio of 13:1 to 140:1 grams of oil to grams of ferric hydroxide solids in the mine water.

21. The method of treating mine water to remove ferric hydroxide of claim 19 further comprising combining the mine water and fatty oil with a predetermined amount of a flotation reagent and agitating the mixture of mine water, fatty oil and flotation reagent.

22. The method of treating mine water to remove ferric hydroxide of claim 21 wherein the predetermined quantity of flotation reagent is from approximately a ratio of $5 \times 10^{-5}:1$ to $50 \times 10^{-5}:1$ grams of flotation reagent to grams of ferric hydroxide solids in the mine water.

23. The method of treating mine water to remove ferric hydroxide of claim 19 wherein the first predetermined period of time is from approximately 5 to 125 seconds.

24. The method of treating mine water to remove ferric hydroxide of claim 23 comprising stirring the mixture at from approximately 6000 to 12000 rpm.

25. The method of treating mine water to remove ferric hydroxide of claim 24 wherein the second predetermined period of time is less than approximately five seconds.

26. The method of treating mine water to remove ferric hydroxide of claim 19 wherein the second predetermined period of time is less than approximately five seconds.

27. The method of treating mine water to remove ferric hydroxide of claim 19 wherein the fatty oil is derived from one or more straight chain alkanoic acids of the general formula $CH_3(CH_2)_nCOOH$.

28. The method of treating mine water to remove ferric hydroxide of claim 19 wherein the fatty oil is derived from one or more fatty acids selected from the group consisting of oleic acid and linoleic acid.

29. The method of treating mine water to remove ferric hydroxide and zinc of claim 19 further comprising recovering zinc from the agglomerated ferric hydroxide, zinc and oil.

30. A method of treating mine water to remove ferric hydroxide and zinc comprising:

combining acidic mine water with a fatty oil and a flotation reagent to produce a mixture, the fatty oil being present in an amount from approximately a ratio of 13:1 to 140:1 grams of oil to grams of ferric hydroxide solids in the mine water, the flotation reagent being present in an amount from approximately a ratio of $5 \times 10^{-5}:1$ to $50 \times 10^{-5}:1$ grams of flotation reagent to grams of ferric hydroxide solids in the mine water;

agitating the mixture by stirring at between approximately 6000 and 12000 rpm for from approximately 5 to 125 seconds to agglomerate solid ferric hydroxide, zinc and oil;

allowing the agitated mixture to settle within a vessel to cause agglomerated ferric hydroxide, zinc and oil to rise to an upper level of the agitated mixture in less than five seconds to provide a settled mixture of agglomerated ferric hydroxide, zinc and oil floating atop remaining liquid therebelow; and separating the agglomerated ferric hydroxide, zinc and oil at the upper level of the settled mixture from the remaining liquid.

31. The method of treating mine water to remove ferric hydroxide and zinc of claim 30 further comprising recovering zinc from the agglomerated ferric hydroxide, zinc and oil.

32. The method of treating mine water to remove ferric hydroxide and zinc of claim 30 further comprising recovering zinc from the agglomerated ferric hydroxide, zinc and oil.

* * * * *